United States Patent [19]

Price

[11] Patent Number: 4,955,434
[45] Date of Patent: Sep. 11, 1990

[54] RADIATOR ASSEMBLY AND A COWL ASSEMBLY THEREFOR

[75] Inventor: Henry C. Price, Carmarthen, United Kingdom

[73] Assignee: Llanelli Radiators Limited, United Kingdom

[21] Appl. No.: 377,842
[22] PCT Filed: Jul. 25, 1988
[86] PCT No.: PCT/GB88/00607
  § 371 Date: Jun. 19, 1989
  § 102(e) Date: Jun. 19, 1989
[87] PCT Pub. No.: WO89/00931
  PCT Pub. Date: Feb. 9, 1989

[30] Foreign Application Priority Data

Jul. 24, 1987 [GB] United Kingdom ............... 8717649

[51] Int. Cl.$^5$ ............................................. F01P 11/10
[52] U.S. Cl. ....................................... 165/122; 165/51; 123/41.49; 415/219.1
[58] Field of Search ......................... 165/51, 148, 122; 123/41.49; 415/213.1, 219.1; 180/68.1

[56] References Cited

U.S. PATENT DOCUMENTS

| 3,795,274 | 3/1974 | Fieni | 165/122 |
| 4,185,688 | 1/1980 | Wiater et al. | 165/122 |
| 4,662,822 | 5/1987 | Foeldesi et al. | 415/213.1 |
| 4,685,513 | 8/1987 | Longhouse et al. | 165/121 |

FOREIGN PATENT DOCUMENTS 2130304A 5/1984 United Kingdom ............. 123/41.49

Primary Examiner—Martin P. Schwadron
Assistant Examiner—Allen J. Flanigan
Attorney, Agent, or Firm—David P. Gordon

[57] ABSTRACT

A radiator assembly (11) is described in which a cowl assembly (20) associated with the radiator assembly (11) is secured to heat exchange matrix (12). The cowl assembly (20) has two securing means (22, 23) which can be brought into locking engagement with the ends (16, 17) of the heat exchange matrix (12) by rotation of the cowl assembly (20) relative to the heat exchange matrix (12).

20 Claims, 2 Drawing Sheets

RADIATOR ASSEMBLY AND A COWL ASSEMBLY THEREFOR

This invention relates to a radiator assembly and in particular to a cowl assembly for such a radiator assembly.

It is known for a radiator assembly to have a cowl assembly secured to it by means of bolts passing through the cowl, each bolt being engageable with a nut fixed to a casing of the radiator assembly.

The use of such a method of attachment has the disadvantage that it is time consuming to fit or remove the cowl from the radiator and hence costly.

According to a first aspect of the invention there is provided a cowl assembly for a radiator comprising a duct portion to direct cooling air towards or away from a fan and at least two securing means on one end of said duct portion to secure said cowl assembly to a radiator by co-operation with opposite ends thereof, the arrangement being such that in a first unlocked position a part of each securing means can pass over the adjacent end of the radiator and in a second locked position said part of each securing means is unable to pass over the adjacent end of the radiator with which it is engaged thereby preventing separation of the cowl assembly from the radiator, the transition from said first position to said second position being acheived by rotation of said cowl assembly relative to said radiator.

This has the advantage that the cowl assembly can be quickly and cheaply fitted and also requires no fixing points to be accurately positioned on the radiator.

Preferably, each securing means is a U-shaped member having a bridge portion and two limbs one of which is connected to said duct portion.

Advantageously, said cowl assembly further includes locking means to selectively retain said securing means in said second locked position.

The locking means may be an arm extending radially away from said duct portion which is adapted at its free end for attachment to a header tank of the radiator.

The arm may be adapted by having a slot formed therein through which an attachment bolt can be passed.

Advantageously, the cowl assembly may be a plastics moulding, the duct portion and the two securing means being formed as an integral part thereof.

According to a second aspect of the invention there is provided a radiator assembly including a cowl assembly according to the first aspect of the invention, the radiator assembly further including an inlet header tank, an outlet header tank and a heat exchange matrix connected therebetween, the heat exchange matrix having two end faces used to secure said cowl assembly thereto.

The invention will now be described by way of example with reference to the accompanying drawing of which:

Figure 1:
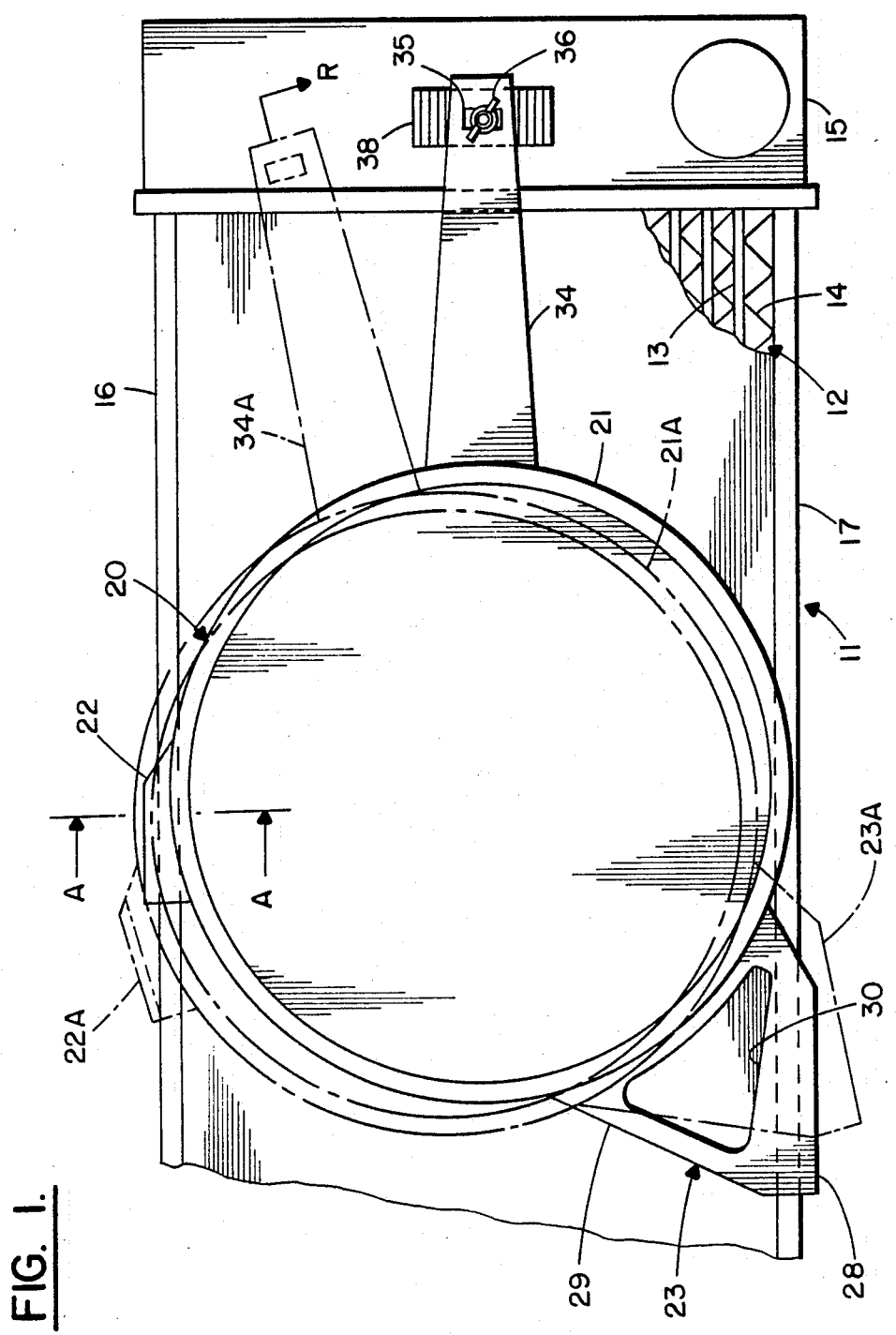
FIG. 1 is a rear view of a radiator assembly according to a second aspect of the invention having a cowl assembly according to a first aspect of the invention attached to it.
Figure 2:
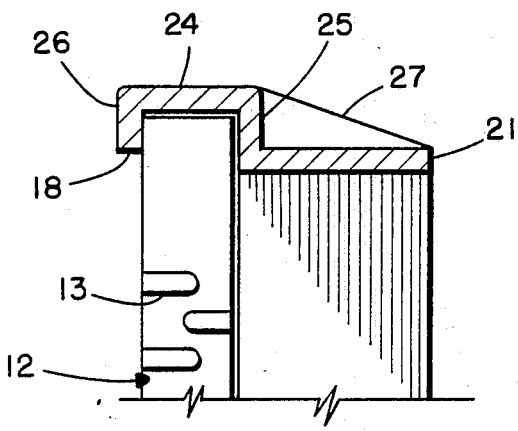
FIG. 2 is a view on the line A—A on FIG. 1.
Figure 3:
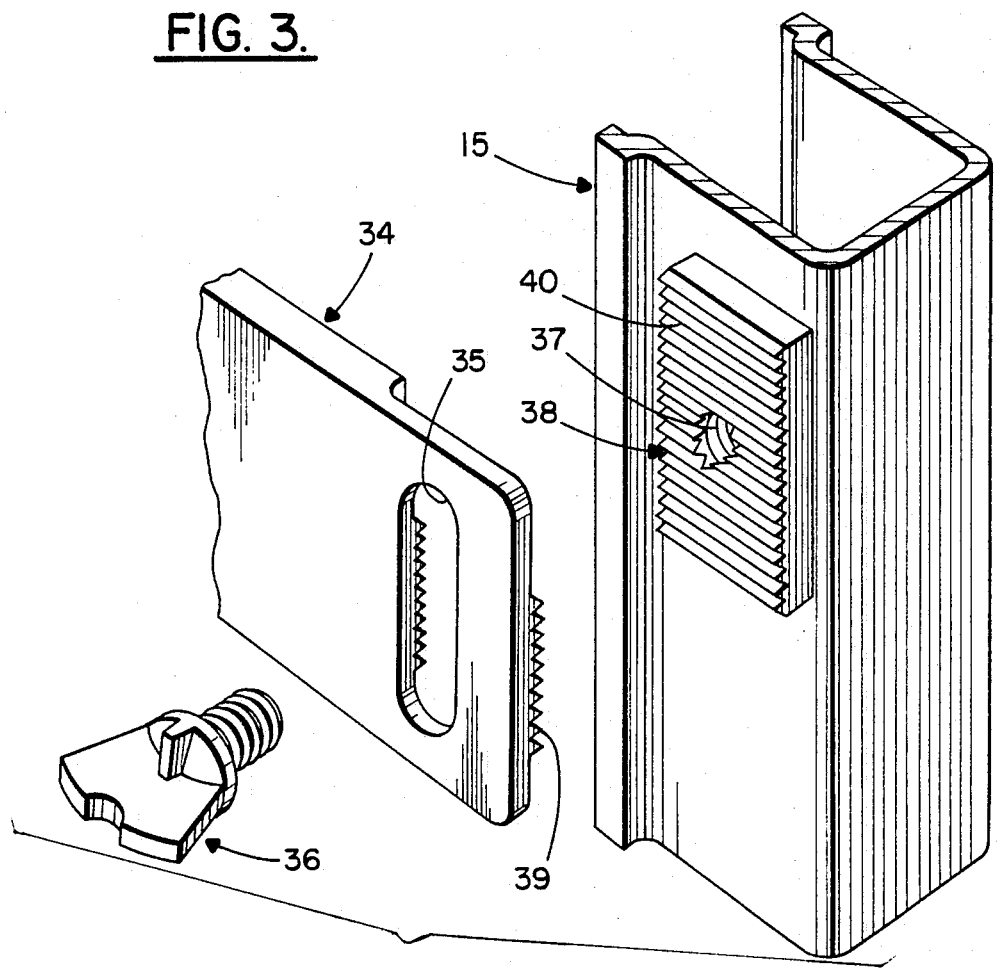
FIG. 3 is a scrap exploded view of part of the radiator assembly shown in FIG. 1.

With reference to FIGS. 1 to 3 there is shown a radiator assembly 11 having a heat exchange matrix 12 in the form of tubes 13 and corrugated finning 14, a plastic inlet header tank (not shown), a plastic outlet header tank 15, an upper side plate 16, a lower side plate 17 and a cowl assembly 20.

The structure of the matrix 12 is conventional in construction, the tubes 13 extending between the inlet and outlet header tanks 15 with the corrugated finning 14 packed in between.

The cowl assembly comprises a duct portion 21, a locking means in the form of an arm 34 extending radially outwardly from the duct portion 21 and two securing means in the form of upper and lower lugs 22 and 23.

The cowl assembly is a plastics moulding, the duct portion 21 and the upper and lower lugs 22 and 23 being formed as an integral part thereof.

The upper lug 22 is U-shaped in cross-section having a bridge portion 24 to span an end of the matrix 12 and two limbs 25,26. One of the limbs 25 extends radially outwardly from a position of juncture with the duct portion 21 to join the bridge portion 24 and is strengthened by means of a web 27. The free limb 26 has a free end 18 and extends radially inwardly from the position where it joins the bridge portion 24.

The lower lug 23 is also U-shaped in cross-section and has a bridge portion 28 and two limbs. The limb 29 is joined to the same end of the duct portion 21 as the limb 25 but is longer than and spaced apart from the limb 25. The limb 29 has an aperture in it to allow for the passage of air therethrough. The free limb has a free end and extends radially inwardly from the position where it joins the bridge portion 28.

The arm 34 extends radially outwardly from the duct portion 21 and has a slot 35 near its free end. The slot 35 allows for the passage of an attachment bolt 36 which is engageable with a threaded aperture 37 in a boss 38 moulded onto the outlet header tank 15.

The area around the slot 35 has serrations 39 formed in it for co-operation with like serrations 40 on the boss 38. The engagement of the serrations 39 with the serrations 40 being used to prevent rotation of the arm 34 so that the attachment bolt 36 merely prevents disengagement of the two sets of serrations 39 and 40.

To attach the cowl assembly 20 to the matrix 12 the cowl assembly is positioned adjacent the rear face of the matrix 12 with the lugs in the unlocked position as shown by reference numerals 22A and 23A. In this position the duct portion is positioned as shown by reference numeral 21A and the arm is in the position as shown by reference numeral 34A.

The cowl assembly 20 is then moved towards the matrix 12 so that the free end 18 of the limb 26 passes over the upper side plate 16 and the corresponding free end of the free limb of the lower lug 23 passes over the lower side plate 17.

The cowl assembly is then rotated in the direction of the arrow R on FIG. 1 which moves the lugs into the approximate position shown by reference numerals 22,23. In this position the distance between the free end 18 of the limb 26 and the corresponding free end of the free limb of the lug 23 is less than the distance between the outer faces of the upper and lower side plates 16 and 17 thereby preventing separation of the cowl assembly 20 from the matrix 12.

In this position the free limbs of the lugs 22 and 23 extend behind the side plates 16 and 17 but the cowl assembly 20 is free to slide along the matrix 12 to allow the slot 35 to be aligned with the threaded aperture 37. To bring the cowl assembly 20 into the locked position it is frther rotated in the direction of arrow R until the bridge portions 24 and 28 contact the side plates 16 and 17 at which position it is secured by means of the attachment bolt 36.

Although this invention has been described with reference to a radiator assembly having side plate construction it will be appreciated that the lugs could co-operate with the outer tubes of the matrix as no special fixing means are required on the matrix.

It is an advantage of the embodiment described that the locking arrangement is able to readily accommodate tolerance variations it being only required to rotate the cowl assembly a further or less amount.

The invention is not limited to the embodiment described other arrangements which allow the cowl assembly to be removed from the radiator in a first position and prevent separation of the cowl assembly from the radiator in a second locked position, the transition from said first position to said second position being acheived by rotation of said cowl assembly relative to said radiator are envisaged. The side plates could for example be L-shaped and the cowl assembly could have tapered flanges for engagement therewith.

I claim:

1. A cowl assembly for a radiator comprising a duct portion to direct cooling air towards or away from a fan and at least two securing means on one end of said duct portion to secure said cowl assembly to a radiator by co-operation with opposite ends thereof, the arrangement being such that in a first unlocked position a part of each securing means can pass over the adjacent end of the radiator and in a second locked position said part of each securing means is unable to pass over the adjacent end of the radiator with which it is engaged thereby preventing separation of the cowl assembly from the radiator, the transition from said first position to said second position being acheived by rotation of said cowl assembly relative to said radiator.

2. A cowl assembly as claimed in claim 1 in which each securing means is a U-shaped member having a bridge portion and two inwardly directed limbs one of which is connected to said duct portion.

3. A cowl assembly as claimed in claim 1 in which said cowl assembly further includes locking means to selectively retain said securing means in said second locked position.

4. A cowl assembly as claimed in claim 3 in which said locking means is an arm extending radially away from said duct portion which is adapted at its free end for attachment to a header tank of the radiator.

5. A cowl assembly as claimed in claim 4 in which said arm is adapted by having a slot formed therein through which an attachment bolt can be passed.

6. A cowl assembly as claimed in claim 5 in which the cowl assembly is a plastics moulding and the duct portion and the two securing means are formed as an integral part thereof.

7. A radiator assembly including a cowl assembly as claimed in claim 5, the radiator assembly further including an inlet header tank, an outlet header tank and a heat exchange matrix connected therebetween, the heat exchange matrix having two end faces used to secure said cowl assembly thereto.

8. A radiator assembly as claimed in claim 7 in which the area surrounding the slot has serrations formed in it for co-operation with like serrations on one of the header tanks.

9. A cowl assembly for a radiator comprising a duct portion to direct cooling air towards or away from a fan and at least two securing means on one end of said duct portion to secure said cowl assembly to a radiator by co-operation with opposite ends thereof, the arrangement being such that in a first unlocked position the cowl assembly can be removed from the radiator and in a second locked position separation of the cowl assembly from the radiator is prevented, the transition from said first position to said second position being acheived by rotation of said cowl assembly relative to said radiator.

10. A cowl assembly as claimed in claim 2 in which said cowl assembly further includes locking means to selectively retain said securing means in said second locked position.

11. A cowl assembly as claimed in claim 10 in which said locking means is an arm extending radially away from said duct portion which is adapted at its free end for attachment to a header tank of the radiatior.

12. A cowl assembly as claimed in claim 11 in which said arm is adapted by having a slot formed therein through which an attachment bolt can be passed.

13. A cowl assembly as claimed in claim 1, in which the cowl assembly is a plastics moulding and the duct portion and the two securing means are formed as an integral part thereof.

14. A cowl assembly as claimed in claim 3, in which the cowl assembly is a plastics moulding and the duct portion and the two securing means are formed as an integral part thereof.

15. A cowl assembly as claimed in claim 10, in which the cowl assembly is a plastics moulding and the duct portion and the two securing means are formed as an integral part thereof.

16. A cowl assembly as claimed in claim 12, in which the cowl assembly is a plastics moulding and the duct portion and the two securing means are formed as an integral part thereof.

17. A radiator assembly including a cowl assembly as claimed in claim 1, the radiator assembly further including an inlet header tank, an outlet header tank and a heat exchange matrix connected therebetween, the heat exchange matrix having two end faces used to secure said cowl assembly thereto.

18. A radiator assembly including a cowl assembly as claimed in claim 4, the radiator assembly further including an inlet header tank, an outlet header tank and a heat exchange matrix connected therebetween, the heat exchange matrix having two end faces used to secure said cowl assembly thereto.

19. A radiator assembly including a cowl assembly as claimed in claim 10, the radiator assembly further including an inlet header tank, an outlet header tank and a heat exchange matrix connected therebetween, the heat exchange matrix having two end faces used to secure said cowl assembly thereto.

20. A radiator assembly including a cowl assembly as claimed in claim 12, the radiator assembly further including an inlet header tank, an outlet header tank and a heat exchange matrix connected therebetween, the heat exchange matrix having two end faces used to secure said cowl assembly thereto.

* * * * *